Feb. 14, 1950 W. SLEPICA 2,497,473
SECURING CLIP FOR FISH PLUGS
Filed Nov. 22, 1948
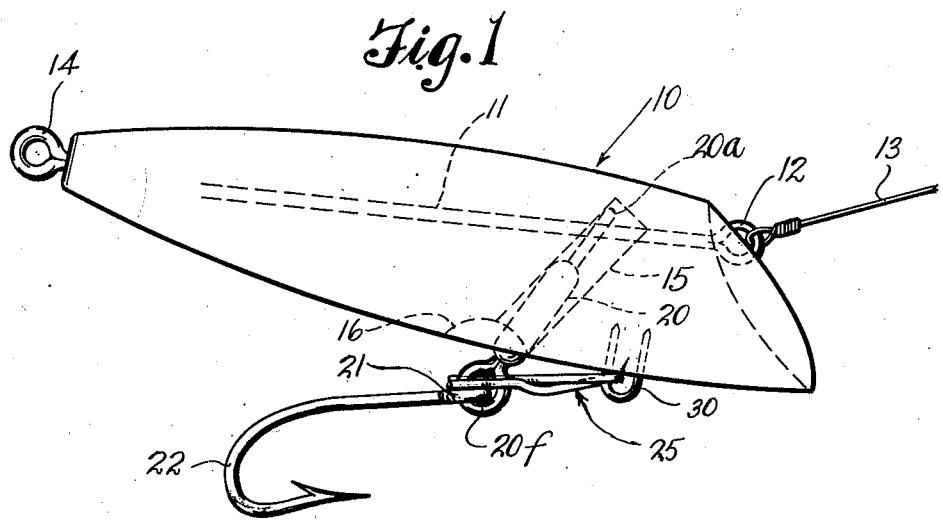
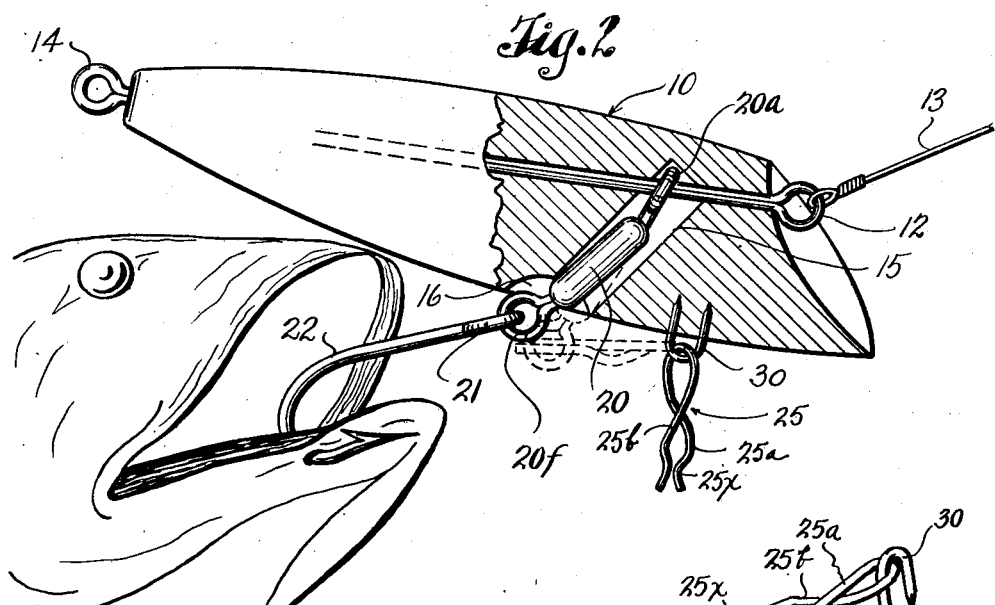
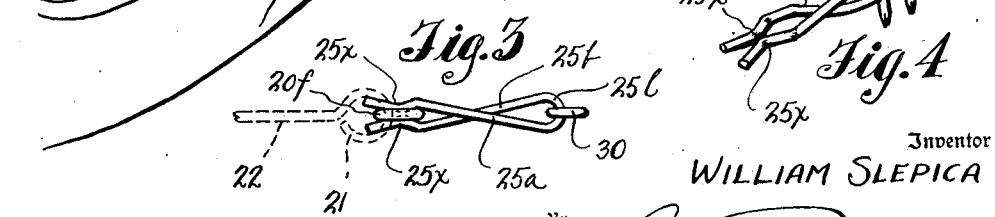
Inventor
WILLIAM SLEPICA
By Cook & Robinson
Attorney

UNITED STATES PATENT OFFICE 2,497,473

SECURING CLIP FOR FISH PLUGS

William Slepica, Seattle, Wash.

Application November 22, 1948, Serial No. 61,367

4 Claims. (Cl. 43—42.04)

This invention relates to fish lures and more particularly to fish lures of those kinds generally known and referred to as plugs. Specifically stated, the present invention pertains to a plug to which a fish hook is closely attached by means of a swivel and wherein means is provided on the plug for holding the swivel and hook against free rotation, and the hook pointed in a definite direction relative to the plug as drawn through the water, until struck by a fish.

It is the principal object of this invention to provide a yieldingly releasable securing clip on the plug, whereby the swivel to which the fish hook is directly attached will be held in a position at which the hook point cannot mar or damage the plug or become fouled therewith and also will be pointed in the most advantageous direction relative to the plug to catch a fish when the fish strikes. Furthermore, to provide a swivel holding clip from which the swivel will readily be released when the fish strikes the hook and exerts pull on the swivel.

A further object of this invention is to provide a yieldable securing means in the form of a spring wire clip which may be readily applied and easily removed from the plug for replacement if such should be desired.

Yet another object of the invention is to provide a securing clip for this specific purpose that is simple in construction and design, relatively inexpensive to manufacture, and easy to apply or remove.

Other objects of the invention reside in the specific form or shape of the clip and in the combination of parts employed and mode of use of the plug as will hereinafter be fully described.

In accomplishing the above mentioned and other objects of the invention, I have provided the improved details of construction, the preferred forms of which are illustrated in the accompanying drawings, wherein:

Fig. 1 is a side view of a plug to which a swivel holding clip is applied in accordance with the objects of the present invention.

Fig. 2 is a side view of the plug, illustrated partly in section and showing in dotted lines the positions of the swivel and swivel holding clip when engaged and, in full lines, showing the clip when the swivel is disengaged therefrom.

Fig. 3 is an under side view of the swivel securing clip as applied to the lower eye of the swivel.

Fig. 4 is a perspective view of the swivel holding clip.

Referring more in detail to the drawings:

A typical form of fish plug is herein designated in its entirety by reference numeral 10. It is shown as being longitudinally bored as required to receive a wire or rod 11 of small diameter therethrough. This wire is formed at the forward end of the plug with a loop or eye 12 to which a fish line, or leader, 13 is attached. The rear end of the wire 11 may be anchored in any suitable manner.

Formed in the body of the plug, somewhat forward of the center point, is a hole or passage 15 that leads upwardly from the bottom or belly surface of the plug, inclined toward the nose at about a forty-five degree angle, and passes through the bore which contains wire or rod 11. At the lower end of the hole 15, the plug is recessed as at 16.

Contained loosely in the hole or passage 15, and within the plug body, is a swivel 20 of a common form. This includes a swivel eye 20a at its upper end, through which the wire 11 passes to secure the swivel in the plug. At the lower end of the swivel is a swivel eye 20f to which the loop 21 of the shank of a fish hook 22 is applied.

By reference to Fig. 2, it will be understood that the swivel holds the eye 20f closely adjacent the belly of the plug and that the recess 16 is provided in the plug in order to give ample clearance for freedom of turning of this eye 20f when the fish is caught on the hook.

The present invention pertains to fish plugs of the above character in general, regardless of the particular means for or manner of securing the swivel in the plug body or manner of attaching the line to the plug, and regardless of the use of hooks in addition to the hook 21 herein shown. In such plugs, if the swivel is left free to turn when drawn through the water, the hook point frequently mars or damages the plug body, or it becomes fouled therewith and is not always pointed in the forward direction that is most advantageous to catch a fish when it strikes. For these reasons, the present swivel holding clip has been employed. It will now be described.

The clip, designated in its entirety by numeral 25, is preferably made from a single piece of nickel silver wire, bent upon itself first to form a U-shaped member. Then the two leg portions 25a and 25b are crossed, as shown in Fig. 3. Beyond the crossing point, the legs are bent in a manner as may be required to bring their end portions into close coextensive relationship.

These close portions, hereinafter referred to as the jaw portions, are of such length that they may receive the swivel eye 20f flatwise between them and will span it diametrically as illustrated in Fig. 1. Also, it is desirable that these coacting jaw portions be bent toward V-form, to provide pointed portions 25x, that they may enter the eye 20f from opposite sides, and thus serve to prevent easy slippage of the eye from between the jaw portions.

It is to be understood that the looped end of this slip designated at 25b, is applied to a staple or the like, as shown at 30, and the staple is driven into the belly of the plug directly forward of the hole 15, at a predetermined distance at which the lower eye 20f of the swivel may be applied between the jaws of the clip as shown in Fig. 3, and when so applied the swivel will be pulled forward in passage 15, as to the position in which it is shown in Fig. 1.

It is also to be understood that the loop 21 of the shank of the fish hook is so applied to the swivel eye 20f that, when the eye is held in the clip as in Fig. 1, the point of the hook will be forwardly directed as illustrated, this being the most advantageous position.

With the parts joined as shown in Fig. 1, should a fish strike the hook, the swivel eye 20f will be disengaged from between the clip jaws either by reason of the direct rearward pull of the hook or by the twisting or rotating force applied by the caught fish. As soon as the swivel is thus disengaged from the clip, the clip swings out of the way and the swivel is free to rotate.

Having thus described my invention, what I claim as new therein and desire to secure by Letters Patent is:

1. A fish plug, a swivel secured at its inner end to the plug, a hook directly connected to the outer end member of the swivel, and a clip affixed to the plug forwardly of the swivel and adapted to have applied thereto that member of the swivel to which the hook is applied to normally hold the swivel in a forward position relative to the plug and the hook in position that its point is forwardly directed; said outer end member of the swivel being disengageable from the clip by pull thereon through the mediacy of the hook as caused by the strike of a fish.

2. A fish plug formed with a downwardly opening bore, a swivel contained in part in the bore for slight forward and rearward movement of its lower end portion, and fixed at its upper end to the plug and having a swivel eye at its lower end, a fish hook having a loop at the end of its shank applied to said eye, and a spring clip secured by means of an affixing element to the plug forwardly of the bore outlet and adapted to receive therein and yieldingly grip the swivel eye to hold the latter in a forward position and the hook in such position that its bight is turned away from the plug and its point is forwardly directed; said swivel eye being disengageable from the clip by rearward pull thereon as effected by the strike of a fish on the hook.

3. A combination as recited in claim 2 wherein the said clip comprises a spring wire member, bent to form a loop at one end through which the affixing element is applied and a pair of crossed legs with end portions thereof designed to coact to yieldably grip the swivel eye between them, and said end portions of the legs being bent to form V-shaped portions that may enter the swivel eye from opposite sides.

4. A fish plug adapted for securement at its forward end to a line, and formed with a downwardly and rearwardly opening bore, a swivel contained in said bore and secured in the plug at its upper end for limited forward and rearward movement at its lower end, and having a swivel eye at its lower end depending below the plug, a fish hook having a loop at the end of its shank applied to the swivel eye, and a spring clip comprising a piece of spring wire bent to form a loop and crossed, coextensive leg portions, a staple applied through the loop and to the under side of the plug forwardly of the bore to freely attach the clip; said leg portions of the clip being adapted to releasably grip the swivel eye between them to retain the swivel in its forward position and the hook against swiveling action, and to hold the bight of the hook turned away from the plug and the hook point in a forwardly directed position and said swivel eye being releasable from the clip for free swiveling action of the hook by rearward pull thereon as effected by the strike of a fish on the hook.

WILLIAM SLEPICA.

REFERENCES CITED

The following references are of record in the file of this patent:

UNITED STATES PATENTS

| Number | Name | Date |
|---|---|---|
| 1,050,759 | Betts et al. | Jan. 14, 1913 |
| 1,700,332 | Pflueger | Jan. 29, 1929 |
| 2,102,492 | Stolley | Dec. 14, 1937 |